US010284998B2

United States Patent
Simonides et al.

(10) Patent No.: US 10,284,998 B2
(45) Date of Patent: May 7, 2019

(54) HEARING AUGMENTATION SYSTEMS AND METHODS

(71) Applicant: K/S HIMPP, Lynge (DK)

(72) Inventors: Ted Simonides, Palo Alto, CA (US); Steve Manser, Saratoga, CA (US); Dan Keller, Los Gatos, CA (US); Mike Kisch, Menlo Park, CA (US)

(73) Assignee: K/S HIMPP, Lynge (DK)

( * ) Notice: Subject to any disclaimer, the term of this patent is extended or adjusted under 35 U.S.C. 154(b) by 0 days.

(21) Appl. No.: 15/425,002

(22) Filed: Feb. 6, 2017

(65) Prior Publication Data

US 2017/0230767 A1   Aug. 10, 2017

Related U.S. Application Data

(60) Provisional application No. 62/357,469, filed on Jul. 1, 2016, provisional application No. 62/292,809, filed on Feb. 8, 2016.

(51) Int. Cl.
*H04R 1/10* (2006.01)
*H04W 4/02* (2018.01)
*H04R 25/00* (2006.01)

(52) U.S. Cl.
CPC ............ *H04W 4/02* (2013.01); *H04R 25/505* (2013.01); *H04R 25/558* (2013.01);
(Continued)

(58) Field of Classification Search
CPC .... H04R 25/554; H04R 25/558; H04R 25/70; H04R 25/505; H04R 1/1083;
(Continued)

(56) References Cited

U.S. PATENT DOCUMENTS

| 5,479,522 A | 12/1995 | Lindemann et al. |
| 5,485,448 A | 1/1996 | Kishi et al. |

(Continued)

FOREIGN PATENT DOCUMENTS

| WO | 01/54458 A2 | 7/2001 |
| WO | 0154458 A2 | 7/2001 |

(Continued)

OTHER PUBLICATIONS

Non-Final Office Action dated Jan. 8, 2018 in U.S. Appl. No. 15/424,985; 6 pages.

(Continued)

*Primary Examiner* — Yogeshkumar Patel
(74) *Attorney, Agent, or Firm* — William W. Cochran; Cochran Freund & Young, LLC

(57) ABSTRACT

Various systems and methods are disclosed herein to increase the quality of the sound delivered to a user and allow personalization to optimize listening performance and comfort under atypical listening conditions, environment specific adjustment, and data capture to assist in the personalization of the system to the user's needs and preferences. Features disclosed include sound level rating systems that aggregate noise data detected by user's mobile phones or hearing devices to provide a database of real-time noise levels. Additionally, a user's sound settings may be saved in the system by location so that they may be recalled when re-entering a specific location. A remote clinician may tune a hearing device, or a user can tune the device using a pre-recorded audio sample. Also, a user may replay the last X seconds of audio recorded by their hearing device.

20 Claims, 8 Drawing Sheets

(52) U.S. Cl.
CPC ............ *H04R 1/1083* (2013.01); *H04R 25/70* (2013.01); *H04R 2225/41* (2013.01); *H04R 2225/55* (2013.01); *H04R 2460/07* (2013.01)

(58) Field of Classification Search
CPC ............ H04R 2460/07; H04R 2225/55; H04R 2225/43; H04R 2225/41; H04R 2225/61; H04W 4/02; H04W 8/005; H04W 4/021
See application file for complete search history.

(56) References Cited

U.S. PATENT DOCUMENTS

| | | | |
|---|---|---|---|
| 5,721,783 | A | 2/1998 | Anderson |
| 6,021,207 | A | 2/2000 | Puthuff et al. |
| 6,035,050 | A | 3/2000 | Weinfurtner et al. |
| 6,108,486 | A | 8/2000 | Sawabe et al. |
| 6,181,801 | B1 | 1/2001 | Puthuff et al. |
| 6,285,825 | B1 | 9/2001 | Miwa et al. |
| 6,567,524 | B1 | 5/2003 | Svean et al. |
| 6,978,155 | B2 | 12/2005 | Berg |
| 7,945,065 | B2 | 5/2011 | Menzl et al. |
| 8,050,690 | B2 | 11/2011 | Neeraj |
| 8,064,609 | B2 | 11/2011 | Baechler et al. |
| 8,233,913 | B2 | 7/2012 | Mendis |
| 8,379,871 | B2 | 2/2013 | Michael et al. |
| 8,442,435 | B2 | 5/2013 | Jones et al. |
| 8,503,703 | B2 | 8/2013 | Eaton et al. |
| 8,903,431 | B2 | 12/2014 | Koch |
| 9,049,525 | B2 | 6/2015 | Nielsen et al. |
| 9,227,057 | B2 | 1/2016 | McElveen, Jr. |
| 9,253,560 | B2 | 2/2016 | Goldstein et al. |
| 9,439,008 | B2 | 9/2016 | Shennib |
| 2004/0037442 | A1 | 2/2004 | Nielsen et al. |
| 2005/0008176 | A1 | 1/2005 | Pedersen |
| 2005/0255843 | A1 | 11/2005 | Hilpisch et al. |
| 2005/0260985 | A1 | 11/2005 | Rader et al. |
| 2006/0215845 | A1 | 9/2006 | Burleigh et al. |
| 2007/0036364 | A1 | 2/2007 | Okuno |
| 2007/0064954 | A1 | 3/2007 | Booth |
| 2007/0237346 | A1 | 10/2007 | Fichtl |
| 2008/0049957 | A1 | 2/2008 | Topholm |
| 2009/0074206 | A1 | 3/2009 | Bradford et al. |
| 2009/0154741 | A1 | 6/2009 | Woods |
| 2010/0009715 | A1 | 1/2010 | Enzmann |
| 2011/0002490 | A1 | 1/2011 | Zukic |
| 2011/0257974 | A1 | 10/2011 | Kristjansson et al. |
| 2011/0280409 | A1 | 11/2011 | Michael et al. |
| 2011/0293123 | A1 | 12/2011 | Neumeyer et al. |
| 2012/0051569 | A1 | 3/2012 | Blamey et al. |
| 2012/0183165 | A1* | 7/2012 | Foo ........................ H04R 25/50 381/314 |
| 2012/0189140 | A1 | 7/2012 | Hughes |
| 2012/0250916 | A1 | 10/2012 | Hain et al. |
| 2013/0163797 | A1 | 6/2013 | Suzman et al. |
| 2013/0195302 | A1 | 8/2013 | Meincke et al. |
| 2013/0202131 | A1 | 8/2013 | Kemmochi et al. |
| 2013/0308762 | A1 | 11/2013 | Dittberner et al. |
| 2014/0044269 | A1 | 2/2014 | Anderson |
| 2014/0108149 | A1 | 4/2014 | Jabara et al. |
| 2014/0169601 | A1 | 6/2014 | Pedersen |
| 2014/0193007 | A1 | 7/2014 | Solum et al. |
| 2014/0211972 | A1* | 7/2014 | Kim ........................ H04R 25/70 381/314 |
| 2014/0254820 | A1 | 9/2014 | Gardenfors et al. |
| 2014/0278589 | A1 | 9/2014 | Rados et al. |
| 2014/0314245 | A1 | 10/2014 | Asada et al. |
| 2015/0124976 | A1 | 5/2015 | Pedersen |
| 2015/0326965 | A1 | 11/2015 | Sprague et al. |
| 2016/0044425 | A1 | 2/2016 | Westergaard et al. |
| 2016/0057547 | A1* | 2/2016 | Burger ................... H04R 25/00 381/315 |
| 2016/0094921 | A1 | 3/2016 | Chen et al. |
| 2017/0078809 | A1 | 3/2017 | Solum et al. |
| 2017/0230762 | A1 | 8/2017 | Simonides et al. |
| 2017/0230763 | A1 | 8/2017 | Simonides et al. |
| 2017/0230764 | A1 | 8/2017 | Simonides et al. |
| 2017/0230766 | A1 | 8/2017 | Dundas et al. |
| 2017/0230788 | A1 | 8/2017 | Simonides et al. |

FOREIGN PATENT DOCUMENTS

| | | |
|---|---|---|
| WO | 2005052911 A1 | 6/2005 |
| WO | 2006003618 A1 | 1/2006 |
| WO | 2015001135 A2 | 1/2015 |
| WO | WO2015/028050 A1 | 3/2015 |
| WO | 2017139218 A1 | 8/2017 |
| WO | 2018005140 A1 | 1/2018 |

OTHER PUBLICATIONS

Non-Final Office Action dated Jan. 3, 2018 in U.S. Appl. No. 15/424,992; 8 pages.
Non-Final Office Action dated Jan. 4, 2018 in U.S. Appl. No. 15/425,011; 10 pages.
PCT Search Report—PCT/US2017/038075 (dated Oct. 18, 2017).
PCT Search Report—PCT/US2017/016660 (dated Jun. 27, 2017).
Elg, J: "Specification of the Bluetooth System, Core, Version 1.1, Part C, Link Manager Protocol, 3.1 General Response Messages, 3.2 Authentication, 3.3 Pairing, 3.4 Change Link Key, 3.5 Change Current Key." Specification of the Bluetooth System, XX, XX, Dec. 1, 1999.

* cited by examiner

HEARING AUGMENTATION SYSTEMS AND METHODS

CROSS REFERENCE TO RELATED APPLICATIONS

The present application claims benefit of priority to U.S. Prov. Pat. Application Ser. No. 62/292,809, filed Feb. 8, 2016 and entitled HEARING AUGMENTATION SYSTEMS AND METHODS, and to U.S. Prov. Pat. Application Ser. No. 62/357,469, filed Jul. 1, 2016 and entitled HEARING AUGMENTATION SYSTEMS AND METHODS, which are hereby incorporated by reference in their entirety.

FIELD

The present disclosure is directed to personalized sound delivery and hearing aid devices and systems.

BACKGROUND

Hearing systems, including earphones, headphones, head sets, hearing aids and other such devices, deliver sound to the ears of the user. These hearing systems may include certain filtering, amplifying, and other processing techniques applied to detected or received audio data for delivering through speakers as sound to the user's ears to enhance sound quality and filter unwanted background sound noise. Digital Signal Processing "DSP" is a known field including techniques for filtering and processing recorded signals and generating improved signals. Hearing systems are generally not personalized to user preferences in specific sound environments. Accordingly, the settings on hearing devices are generally optimized for the average listener based on hearing thresholds, and average sound environment and are not individually tailored or optimized to certain noise environments. Additionally, users cannot predict the sound levels in restaurants or bars they plan on frequenting. Also, clinicians generally only personalize the settings of a hearing device in their offices, requiring a user to make an appointment and travel to the office whenever a change in settings is desired.

One known hearing aid personalization system is disclosed in U.S. Pat. No. 8,379,871 (Michael et al.), hereby incorporated by reference in the entirety, as: "A personalized hearing profile is generated for an ear-level device comprising a memory, microphone, speaker and processor. Communication is established between the ear-level device and a companion device, having a user interface. A frame of reference in the user interface is provided, where positions in the frame of reference are associated with sound profile data. A position on the frame of reference is determined in response to user interaction with the user interface, and certain sound profile data associated with the position. Certain data is transmitted to the ear level device. Sound can be generated through the speaker based upon the audio stream data to provide real-time feedback to the user. The determining and transmitting steps are repeated until detection of an end event." (Abstract).

What is needed is methods and systems that are personalized to user preferences in specific sound environments. More specifically, the systems and methods need to be individually tailored or optimized to certain noise environments and need to be capable of predicting the sound levels in restaurants or bars that they frequent or plan on frequenting. Further, a system is needed that clinicians can personalize more efficiently without the users needing to make an appointment and travel to the office whenever a change in a setting is desired. Also needed is a mobile device for storing sound settings for an associated hearing device and a system for aggregation and processing of sound data relating to specific establishments.

SUMMARY

Various systems and methods are disclosed herein to increase the quality of the sound delivered to a user when using a hearing system. For example, users of hearing systems generally cannot determine the noise level and quality at an establishment prior to frequenting it, and therefore cannot adjust their hearing devices in advance or make an informed decision to avoid certain establishments (e.g. restaurants, bars, etc.) that are too noisy. For instance, there is no accurate database of sound levels for establishments beyond subjective assessments and personal opinions posted on rating sites such as Yelp.

Furthermore, regardless of whether users are aware of the sound level in advance, hearing devices are rarely optimized for any specific sound environment (e.g., restaurant). Because sound delivery devices are generally not customizable, users cannot adjust the sound settings to optimize them when they enter an environment for which their hearing device is not optimized. Accordingly, hearing systems, including hearing aids, are set to be the most useful for the average noise environment, and therefore may be poorly suited to specific environments that have noise profiles that deviate considerably from the average noise environment (e.g., divergent frequencies and amplitudes of sound from the average).

In fact, clinicians can only customize the audio settings of most hearing devices in the office after setting up an appointment. Therefore, adjusting the device settings for particular environments such as, but not limited to restaurants, concerts and group settings, while in a clinician's office is not practical or effective in addressing situation-specific listening complaints. Hearing devices generally are not optimized for any particular environment beyond that of a clinician's office. Accordingly, many users suffer situational hearing problems due to poor environmental acoustics and excessive background noise. Moreover, users may enter environments that have dangerous levels of noise. In fact, exposure to dangerous noise is a leading cause of preventable hearing loss and is even more profound in individuals hearing aid devices who already suffer hearing impairment.

Systems and methods have been developed to more effectively rate the noise level and quality of various locations. For instance, the hearing system may include a hearing device (e.g. hearing aid) and an integrated control, for instance a mobile phone or computing device that is wirelessly linked to the sound delivery device. For example, the hearing aid and associated device, e.g., mobile phone or PDA, may be wirelessly linked using radio technology, such as Bluetooth® compliant synchronous connection-oriented SCO channel protocol (e.g., Core Version 5.0 and predecessor versions) as regularly updated and enhanced by Bluetooth SIG Working Groups to meet evolving technology and market needs. The hearing aid and/or wireless device is enabled with Bluetooth compliant serial port profile "SPP", control channel, SCO channel and other necessary protocols and functions to insure proper operation and communication of signals and data. Other compatible platforms and specifications may be used to establish wireless links between devices. Microphone is a type of transducer that transfers or translates mechanical energy-such as sound vibration and converts that energy into an electrical signal, which may be amplified and/or further modified such as by an analog-to-digital converter to generate a digital signal for use in data/signal processing systems. The microphones, such as omnidirectional microphones, on the sound delivery device and/or the associated mobile device may then detect sound levels at different locations at different times. This will allow a significant amount of data from different users to be collected, aggregated and uploaded to a server for analysis to make the data available for these and other users to determine the current or average sound levels at particular establishments. Accordingly, a database could be created that includes sound level and characteristic information for different cities, restaurants, sporting venues, public transportation, and others places. These sound level ratings may then be aggregated by a server in a database and accessed by users through an application on their mobile phone, a website, or through integration into websites like Yelp.com. To do this, GPS data may be tagged to the sound level data recorded through the microphones to identify the location. Additionally, signal-to-noise ratio, and time-stamp data maybe tagged to the sound level. Alternatively, users may tag or indicate which establishment they are attending after receiving notifications on their mobile device or any combination of the tagging methods for confirmation.

Accordingly, once a hearing system has recorded sound data from the user's current environment, that data may be utilized to adjust the settings on the hearing device manually or automatically. For example, in some embodiments, the user may modify the sound settings manually while gauging the effect in a new environment. This provides a user real time feedback to optimize the sound based on their preferences. For example, the user may set the gain, compression, frequency shaping, output volume, filters or amplifiers (e.g., filtering non-human voice frequencies and amplifying human voice frequencies), and microphone directionality. This may be performed via different methods through a graphical user interface, such as presented on a mobile device in communication with a hearing aid, e.g., via Bluetooth connection. In this manner, the invention enables a user to intuitively and/or graphically optimize the settings while listening in a new or changing environment.

In other embodiments, the sound settings, including Digital Signal Processing (DSP) and filtering algorithms may be automatically and adaptively modified based on the acoustic data that is recorded through the microphones. For example, the audio data detected in certain environments may be monitored for certain amplitudes and frequencies and filtered if they cross a certain threshold. In other embodiments, the device may adaptively adjust the settings to amplify or filter certain frequencies more or less based on the magnitude and presence of certain frequencies. For example, as a voice is getting louder in a certain frequency range and outside of the algorithm target amplitude range, the system may adaptively dampen the sound in that frequency range, and vice versa. As another example, if music is newly detected that has a high amplitude, certain algorithms may be initiated or triggered to filter those additional frequencies.

These optimized sound settings for particular locations may be tagged with GPS or other location data and time stamped to allow a user to easily recall those settings when reentering the same or similar acoustic environment. For example, if a user travels to the same coffee shop each day, the device or mobile phone associated with it may collect GPS data that indicates the user has entered the same geographic location as the coffee shop and retrieve the sound settings for that particular shop. Additionally, if the user attends the shop later in the day when the patrons are more lively and talkative, the noise reduction algorithms may be automatically increased based on the stored settings for that location and time of day. Additionally, these saved settings may be uploaded to the Internet and aggregated along with the noise data for those locations to allow other users to access the sound settings for the location and place uploaded by different users. Alternatively, the mobile device may associate the location with a coffee shop in general and apply a profile or set of settings modeled after typical same-store conditions.

In some embodiments, the database and server may also analyze the data to output settings that are optimal for the particular location or provide ranges of optimal settings and allow a user to choose along a narrowed continuum, which would make the personalization process more efficient. In other embodiments, the average settings utilized by users (as indicative of the choices by users after real time feedback) may be available to other users entering that environment or other environments that are acoustically similar. Accordingly, the user may be presented with options to select particular sound settings upon arriving at a known location based on their own history or other users' history. These settings may also be updated, dynamically, in real time as the microphones of the user's sound delivery device and/or other users' microphones detect changes or updates in the acoustic environment.

In other embodiments, users may have a personal profile associated with their settings that contain certain physiological hearing characteristics entered in by professionals and/or the user. Accordingly, users could be offered sound settings based on the choices of similar users and not based on the entire average of all users that attended a particular location.

In other embodiments, instead of having to travel to the clinician's office to change settings in the device, and particularly out of the box, e.g., when initially setting up the hearing assistance device, the user may first adjust the hearing settings using a pre-recorded audio sample that is delivered to the user's ears through the speaker of the hearing device (e.g. hearing aid or an associated phone/computer's speakers). Accordingly, the audio sample may represent the average or most frequent speech experienced by the average user, or include samplings of the most often experienced frequencies and amplitudes of noises in certain environments. The user may then automatically adjust the settings to an optimal level based on their preferences after hearing the pre-recorded sample. Otherwise, users often will first adjust a sound delivery device out of the box (e.g., a hearing aid) based on the first sound environment they are in (e.g., home) which may not be optimal for the most problematic places, or even work. Accordingly, a pre-recorded sample with a wide range of frequencies and noise will allow the user to adjust the sound settings to an average that is more likely appropriate early in the adjustment process.

Furthermore, systems and methods have been developed to allow a clinician to adjust the sound settings of a sound delivery system remotely. The remotely located clinician will be able to access an individual's hearing device via a network connection to the clinician's computing device (e.g., computer and/or mobile device) and be able to conduct a hearing test, sample the acoustic environment including decibel sound pressure level, spectral content, types of sounds and location of sounds and then tune the device while the person is wearing it in situ. The professional may do this by using an application on their computer or mobile device that could then connect via the Internet to the user's hearing device, mobile device (phone or tablet) and/or computer. The system would allow the professional to manipulate the settings of the hearing device remotely through a data connection using their expertise while receiving direct feedback from a user based on the noise of that particular environment. Then, these settings could be saved by a user and/or the system in a database linked to the systems servers, including with associated GPS and time data. These settings could then be easily accessed and restored, or analyzed for progressive changes in a user's hearing over time.

These changes could also be utilized for proactive identification of problematic hearing changes that may indicate certain hearing pathologies experienced by a user. Certain changes within certain thresholds may cause a message to be sent to a clinician and/or the user to immediately make an appointment to evaluate and diagnose the hearing of the user.

In some embodiments, while the microphone on the hearing device is recording sound it may also save a finite number of seconds or minutes of the audio file in a memory or buffer for instant replay for the user. Therefore, when a user presses a button on the hearing device or their mobile phone, the hearing device or mobile phone may play back the stored audio of the last X seconds. In some embodiments, pressing the button for replay could automatically send the buffered and/or stored audio data to the mobile phone and/or server to be filtered for voice signals or as indicated by a user and saved for continual replay. For example, if a name is repeated or directions are given a user may want it replayed and/or stored. In some embodiments a button on the hearing device or mobile phone may automatically send the previous certain number of seconds of sound recorded from the device microphones to the mobile phone without replaying at the time, but for easy replaying later.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

Figure 1:
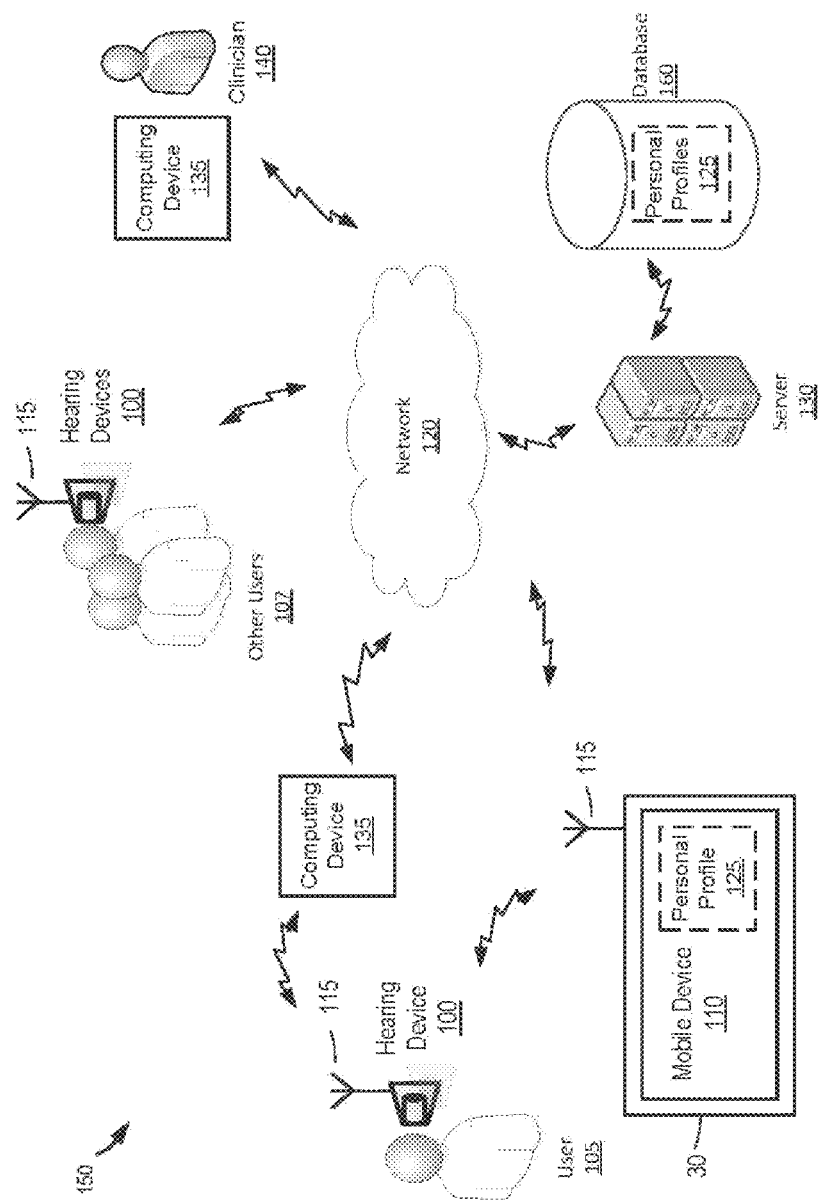
FIG. 1 is an overview of an example hearing system.

In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced.

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Hearing System Overview

FIG. 1 illustrates an overview of an example hearing system 150 according to the present disclosure. The system 150 may include a hearing device 100, associated or used by, a user 105, a mobile device 110 linked with the hearing device using antennas 115, and a personal profile for the user 105 that may be stored optionally on the mobile device 110 or elsewhere (e.g., server). In some embodiments, the hearing device 100 may include a charging case that can store the audio data, and the audio data may be uploaded to a computer (for instance for users without a mobile device) which could then upload data over the network 120, such as, to a server 130. Additionally, a network 120 may also link the mobile device 110 and/or hearing device 100 to a server 130 and database 160 that stores personal profiles, including software for analysis of sound data and performing other functions as disclosed herein. Furthermore, other users 107 with operating hearing devices 100 may also be linked to the network 120 and server 130 and sound/hearing data from the other users 107 hearing devices may be aggregated and stored in the database 160. In addition, a clinician 140 operating a computing device 135 may be connected to the network 120 via a communications component of a computing device 135 to allow the user to diagnose and make changes to the settings of the hearing devices 100. The changes made by clinicians 140 may also be stored in the database 160 for separate or combined reference. This will allow the clinician to remotely diagnose the users 105 and change the settings on their hearing devices 100 while the user is in a noisy environment.

The hearing system 150 efficiently optimizes the hearing device 100 in certain environments based on an accumulation of data from both the user 105 and other users 107, and in some cases the clinician 140. This accumulated data can be utilized to present the user options or automatically set the audio settings on a user's hearing device 100. Furthermore, this data may be utilized by clinicians to evaluate certain settings and improve their recommend settings for a given user 105 and noise environment.

Personal Profiles

The hearing system 150 may include personal profiles 125 of users 105 that include their demographic information and individual hearing characteristics of a particular user 105. For example, the hearing system 150 may, upon initialization or the first time connecting a hearing device 105 to a computer or mobile device 110, prompt the user with a series of questions designed to obtain information for the personal profile to optimize the settings for a particular user 105.

For example, the hearing system 150 may ask the user 105 its age, gender, hearing history, medication, and certain information regarding their hearing related medical history. For example, the system 150 may ask the user: whether they have tinnitus, whether they are deaf in any ears, and other questions related to hearing and hearing health. Additionally, clinical data relating to the user's 105 hearing history may be downloaded or manually entered to a user's profile 125 that includes information regarding a user's 105 sensitivity to certain frequency ranges and amplitudes or combinations of frequencies ranges and amplitudes.

Additionally, the hearing device 100 may perform a hearing test automatically upon initialization that may then be stored with the personal profile 125. The information linked to a user's 105 personal profile 125 may be utilized to make suggestions for certain noise environments by, for example, recommending settings from other users 107 that have similar profiles 125 or have similar characteristics in their profiles 125. Furthermore, the personal profile 125 data could then be associated with the user's 105 audio data that is uploaded to the server 130 and stored in databases 160. This will allow the user's 105 data to be pooled with data associated with other users 107 and data from the clinician 140, including the associated personal profile 125 data for comparisons, and aggregation to discern trends and patterns to improve the recommend settings for users 105. Also, the history of settings associated with a particular user 105 may be used to notify a clinician if the system 150 detects hearing changes (based on the settings chosen) that indicate a potentially problematic hearing issue that is developing. Accordingly, prevention and treatment may be addressed earlier than previously possible and before a hearing condition has deteriorated further or to a point where it is not treatable.

Hearing Device

Figure 2:
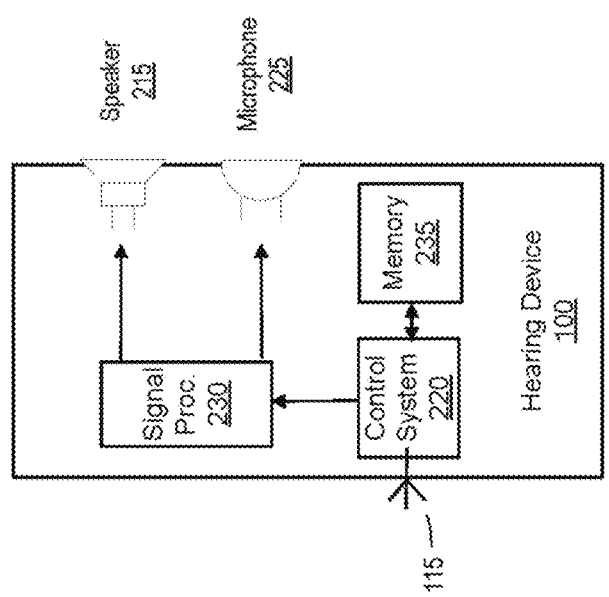
FIG. 2 is a diagram of an example of a hearing device.

FIG. 2 is a diagram of an example hearing device 100 that includes a control system 220 and memory 235 that may be flash memory, solid state memory, a combination, or any other types of computer memory. The control system 220 may be any type of controller or combination of controllers, including a microprocessor, microcontroller, or other processors and associated components. The hearing device 100 may also include an antenna 115 for transmitting and/or receiving wireless signals. The hearing device 100 may employ any well-known radio and transceiver components including components using cellular, wideband, Bluetooth, Wi-Fi, NFC or other frequencies to transmit/receive data to/from an associated mobile device 110. Additionally, the hearing device 100 may include a single or multiple microphone(s) 225 for detecting sound in the ambient environment and a speaker 215 for delivering sound to the user's 205 ear. In some embodiments, the hearing device 100 may include a hearing device that fits into a user's ear, along with a remote microphone that can be located next to the source of the desired sound that would connect to the ear portion of the hearing device with Bluetooth. The hearing device 100 may also include any combination of data and signal processing components 230 including analog to digital converters, filters, noise reduction circuitry, and other signal processing components. These components may be in any combination in order to condition the audio data for transmitting over the speaker or for filtering from the microphone(s).

In some embodiments, the hearing device 100 may contain one or more processors, one or more analog-to-digital converters (ADC) and/or digital-to-analog converters (DAC), power supply including, for example, a battery, a charging function, user interface and indication equipment, such as buttons, and lights/LEDs, and one or more memory 235. The various components may communicate via one or more control/signal buses. The hearing device 100 may buffer and/or store in memory 235 a certain, preselected or configurable amount of audio data from the speaker 215 continuously. In addition, memory 235 may have stored therein one or more of: audio data associated with functions performed on the mobile device 200; program and configuration data, user profile data, sound profile data; radio protocol/configuration/parameter program and data; and control parameters and other data for establishing communication links. In some embodiments, memory 235 may be in the form of flash memory or other nonvolatile memory and may include different types of memory 235. In some embodiments, the amount of audio data stored or recorded may be the last "X" seconds of audio data detected. This audio data may also be filtered accordingly, or stored in compressed or raw audio format. In some cases, the audio data will be stored in the buffer in distinct time blocks (e.g. 1, 2, 3, 4 or 5 second time blocks) and may store 5, 10, 15 seconds, 1 minute, or other amounts of audio data in a buffer or other memory for purposes of: (1) sending data via the antenna 115 to the mobile device and/or over the network 120 to the servers 130 for storage on the database 160. In some embodiments, the database 160 may be on the mobile device or other computing device itself or may be in the "cloud" connected to a remote server 130; (2) accessing via instant replay function directly by replaying over the speaker; and/or (3) other uses. For instance, if you are in a location (e.g., plane, basement) with no Internet access, the audio data may be saved on local memory 235 or on memory 235 of the mobile device 110 until an Internet connection is reached to upload to the remote server 130 and database 160. In some embodiments, the buffer or memory will add a new block of audio data continuously as a new block is recorded, and discard the last block of data.

Sound Ratings by Location

Figure 3:
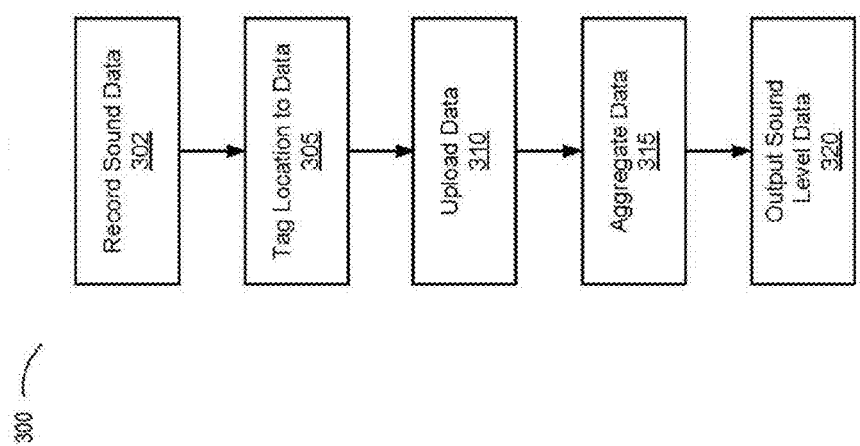
FIG. 3 is a flow chart illustrating a process for aggregating sound level ratings for specific locations.

FIG. 3 illustrates a method for providing access to the current and/or historical sound levels at certain establishments based on data collected from users' (105 or 107) hearing devices 100 and mobile devices 110. The system 150 may also be utilized to record sound data 302 at various locations and establishments, and upload 310 for aggregation of that data 315 in order to output or send 320 it to users 105 or other people to provide them with information about the sound level and type. The audio data may be saved on local memory 235 or on memory 235 of the mobile device 110 until an Internet connection is reached to upload to the remote server 130 and database 160.

For example, the microphone(s) 225 on the hearing device 100, mobile device 110 or other associated or connected microphone(s) 225 may record ambient sound data and store it in the memory 235 and/or upload the data over the network for storage, and/or analysis by the server 130 on the database 160. The audio data may be saved on local memory 235 or on memory 235 of the mobile device 110 until an Internet connection is reached to upload to the remote server 130 and database 160. As each user 105 and all other users 107 each have microphones 225 and would attend different establishments, the pool of users 105 may create data that can be processed to provide detailed information about the sound level and quality at various establishments.

Additionally, a GPS sensor in the mobile device 110 and/or hearing device 100 may tag or associate GPS coordinates to the sound data 305 so that the sound data can be referenced to a particular establishment with a time stamp. Accordingly, all of the sound data for a particular establishment can be aggregated 315 and analyzed to provide feedback to users on the current and typical noise levels 320. Additionally, the GPS data may also be date and time stamped to include additional metrics and averages for certain times and days that may have more noise (e.g., nights and weekends, or special nights).

In order to associate the sound data with a particular establishment or location 305, in some embodiments, the user 105 will have to choose the location 305 from a list of nearby locations. Accordingly, systems and methods are disclosed herein for the system 150 to associate the GPS location data (and in some embodiments time stamp data) with a list of establishments within a certain distance of the current GPS coordinates. This may be useful as some mobile phones 110 may experience interference or have GPS locations that are inaccurate enough that automatic association with a map labeled establishment may not function properly, and be assigned to an incorrect establishment (e.g. restaurant, bar).

Additionally, different establishments may be on different levels of the same structure, and therefore either altitude data may be combined with GPS to determine the location or the user 105 may be provided a list of potential locations that are within a certain distance of the detected GPS coordinates and the user 105. Once the system 150 identifies the closest restaurants or establishments the user 105 could then select their current location on a display or other graphical interface (e.g. on the mobile device). The sound data could then be associated with the location 305 until the user moves outside of a certain range of the location and has left the establishment.

Next, the aggregate of all of the sound data for a particular location must be aggregated/stored and analyzed 215 by the system 150. The data may first be uploaded 310 to the server 130 over the network 120, for analysis and storage in the database 160. The algorithms utilized for analyzing all of the sound data may employee averages, medians, time averages, day averages, current noise levels (e.g., noise recorded within the last hour, 30 minutes, 10 minutes, etc.), pitch of the highest bands of noise, comparison of human voice frequencies with background noises, decibel levels in certain ranges, overall decibel levels and other data processing techniques.

Furthermore, this information must then be accessible or output/sent 320 to users 105 to determine the current or history of noise levels at certain establishments. For example, a user 105 may want to try a new restaurant on a Saturday night in downtown San Francisco but wants to check on the noise levels first. Thus, the user 105 may then send a request to the database to access the current noise levels, average noise levels for a Saturday night (with specific time—also, they can dynamically see what the sound level is in real-time or near real-time, based on current data being continuously uploaded), and any other metrics. Additionally, the user 105 may be more sensitive to noises in certain frequency ranges and the noise level data may be displayed in bands of frequencies of interest. For instance, the output 320 data or indication may be the decibel level in certain frequencies, including human voices, higher pitched noises (like coffee shop espresso machines) or lower frequency music at dance clubs or restaurants. Thus, the user 105 may get an idea of both the level and characteristics of noise at a particular restaurant prior to travelling there. This data could also be integrated with review sites such as Yelp in order to allow a user 105 to easily view noise levels, and/or filter by certain noise levels and types.

The user could use this data 320 to adjust the sound settings on the hearing device 100 based on the indication of noise levels received 320. Accordingly, the data output 320 may include particular frequencies that should be filtered out or that could be automatically removed, including based on user preferences or sensitivities. Additionally, the data output 320 could indicate the user 105 must lower the sound level, or the hearing device 100 could automatically lower the volume of the hearing device 100 based on a relative comparison of the current sound level to a baseline sound level.

Crowd Sourced Sound Settings by Location

Figure 4:
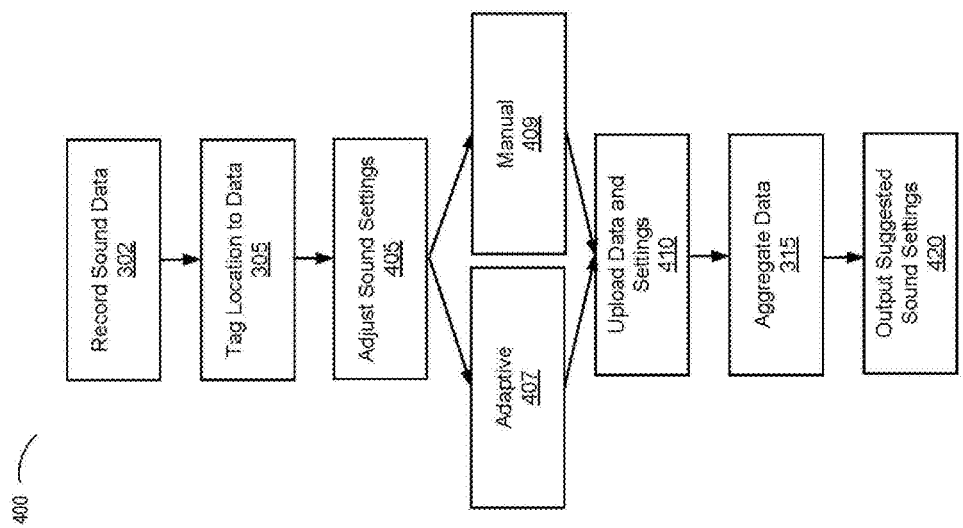
FIG. 4 is a flow chart illustrating a process for suggesting sound settings for specific locations.

FIG. 4 illustrates a method of personalizing sound settings for a particular location that is based on a user's 105 and or other user's 107 preferences and the particular characteristics of that sound environment or location. As described above with respect to the sound ratings, the hearing device 100 or mobile phone 110 may first record sound data 302 in an establishment. Additionally, the location may be tagged 305 (as described herein) to the data, along with the date and time. Then, the sound settings for the hearing device 100 may be adjusted 405 manually 409 or adaptively using an automatic algorithm 407. Once the settings have been adjusted, these settings may be uploaded 410 to a server 130 for aggregation 315 and analysis, which may then be utilized to output suggested sound settings 420 to the same user 105 or other users 107 as individual users return to locations where sound data has been aggregated 315. In some embodiments, the uploading and/or saving the mobile device 110 of sound settings will allow the same user 105 to easily recall the settings when arriving at a new location.

Once a user's 105 location is identified and/or confirmed via manual selection by the user 105, the sound settings may be adjusted or personalized for the location. In some embodiments, the user 105 will manually personalize the sound settings for the particular location. An example of an interface and process for personalization of a hearing device 100 for a particular sound environment is disclosed in U.S. Pat. No. 8,379,871, issued Feb. 19, 2013 titled Personalized Hearing Profile Generation with Real-Time Feedback which is incorporated by reference herein in its entirety. The sound processing modes that may be changed or switched on and off include volume controls, allow certain bandwidths of frequency to be amplified or filtered (e.g., filtering non-human voice frequencies and amplifying human voice frequencies), compression, microphone directionality and general environmental noise reduction algorithms.

In some embodiments, instead of or in addition to manual personalization, the hearing device 100 and or mobile device 110 may automatically evaluate recently detected sound data and determine the optimal or likely optimal settings for the hearing system 150 and/or device 100. For example, the system 150 may adjust the volume level based on the detected decibel level of the environment. Additionally, various filtering algorithms may be applied to certain bandwidths and techniques such as Adaptive Constructive Interference, Destructive Interference, Active Noise Cancellation may be used. For instance, bandwidths that do not generally include frequencies of a human voice for a normal conversational tone (as opposed to singing with music in the background) may be amplified or preserved, while other frequencies associated with ambient noise (i.e. car driving noise, coffee machines, music, etc.) may be reduced or eliminated from the sound that is eventually produced through the speakers 215 of the hearing device 100.

These settings may then be tagged to the location and also the date and time of the setting. These settings and tags may then be uploaded 410 to the server 130 to be aggregated 315 and analyzed by the server 130, and the data stored in the database 160. The settings may also be saved on local memory 235 or on memory 235 of the mobile device 110 until an Internet connection is reached to upload to the remote server 130 and database 160. In some embodiments, the system could pre-populate the settings based on the user's home settings, and then provide an option to the user to update the settings with locally stored new settings when connecting the device to the network, computer or other computing device.

In other embodiments, the data may be sent to over the antenna 115 to the mobile device 110 or the sound data may be sent to the mobile device 110 the GPS data from the mobile device 110 would be tagged to the sound/settings data. In some embodiments, the mobile device 110 and/or the server 130 and database 160 may store the settings to be recalled by the system 150. In some embodiments these settings may be aggregated 315 from all users 107 and analyzed by the server 130 to provide averages or associate certain types of sound settings with various personal profiles 125 or certain characteristics in personal profiles 125. Accordingly, this information may be utilized to output suggested sound settings 420 based on similar users 105 or the same user 105 in similar circumstances.

There are several ways by which sound settings may be output or suggested 420 to a user 105. For instance, if a user 105 has attended a certain location (and even at a certain time) the user 105 may have set the hearing device's 100 settings for that location as disclosed herein. Then the system 150 would have saved those settings and associated with that location (and potentially date and time). Then, once the user 105 reenters that location the system 150 could automatically recall those settings, or pop up a message on the display or user interface of an associated mobile device 110 or an audio message through hearing device's 100 speaker 215 asking whether the user 105 has reentered a suggested location.

If the user 105 indicates it is the correct location, the user's 105 own saved settings may be recalled to allow the user 105 to easily adjust its hearing to that environment. In other embodiments, if the user 105 is new to a location, once the system 150 determines (and/or the user 105) confirms the actual location, setting and/or sound data from other users 107 may be suggested to the user 105, or automatically switched on if the user does not have any saved settings.

Figure 5:
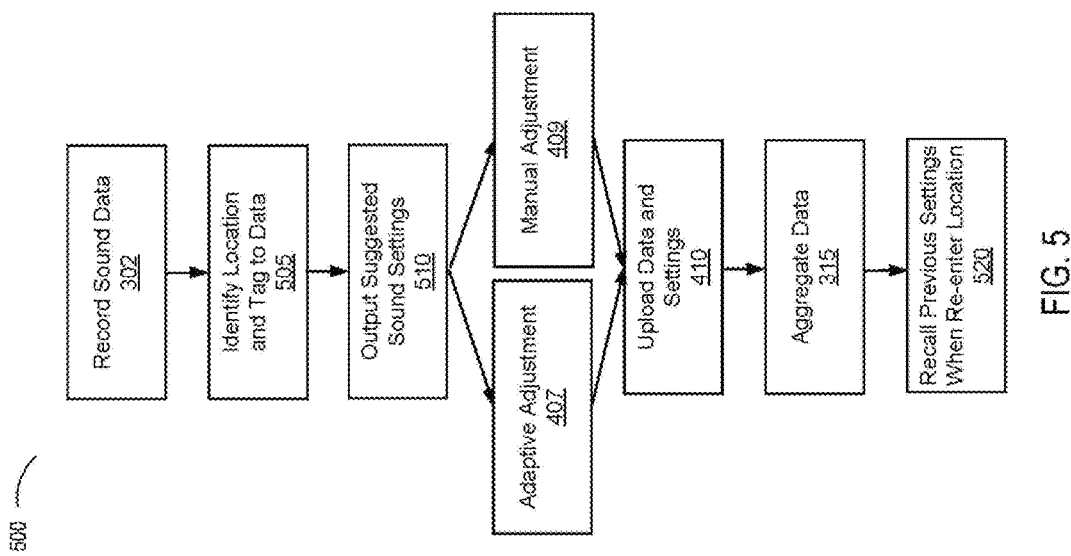
FIG. 5 is a flow chart illustrating a process for outputting suggested sound settings when a user enters a specific location.

For example, in some embodiments, the user's 105 profile 125 may be compared with other user's 107 profiles 125 (and/or data from clinician 140) that have attended the same location, to identify another user's profile 125 with similar characteristics (that are relevant to sound perception and hearing) and recommend settings or ranges of settings to the user 105 based on the similar user 107. In some embodiments, after those sound settings are output as suggested 510 (as shown in FIG. 5), the user 105 may then further manually adjust the settings 407 or the system may automatically adjust the settings 409 to further refine the settings based on the user's profile 125, the user's history of sound settings, the currently detected ambient sound, or through manual adjustment 409. In some embodiments, the settings may be selected by finding settings from other users 107 that were based on sound data that was most similar to the current sound levels, for example, within certain frequencies. Various matching, machine learning, statistical analysis, or other algorithms may be utilized to match the settings to one another from different user's 107 and profiles 125.

Then, after the user 105 further refines the settings that were suggested, the settings may be uploaded 410 along with the sound data and further aggregated and saved for later use or analysis. Then, as above, that individual user's 105 sound settings may be recalled when the user 105 re-enters the same location 520, with possible further refinements as described above with respect to FIG. 5.

Tuning by Remote Clinician

In addition to being set automatically or manually by a user 105, a remotely located clinician may also be able to tune the audio settings of a hearing device 100 as disclosed herein using the present system 150. This will allow a professional with expert training to remotely adjust the settings, based on the sound data detected by the hearing device 100 and real-time feedback from the user 105 while the user 105 is in the actual environment of interest. This may increase the speed and accuracy with which the device 100 is set, and also the frequency at which the device 100 may be expertly personalized for particular locations.

Figure 6:
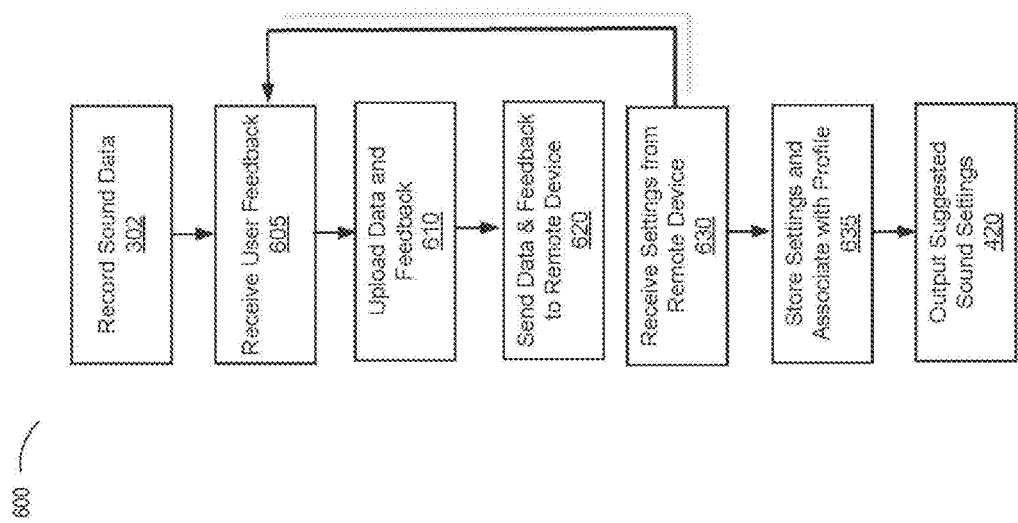
FIG. 6 is a flow chart illustrating a process by which a remotely located clinician may tune a hearing device.

FIG. 6 illustrates a flow chart of a process 600 by which a remotely located clinician may adjust the hearing device 100. For instance, the hearing device 100 or mobile device 110 may first detect or record sound data 302. Then the user 105 may also provide verbal or electronic feedback 505 through the mobile device or hearing device 100 based on the current settings. Then, this data and feedback may be uploaded 610 and sent over the network 120 the server 130 and/or a remote clinician's computing device 135 for analysis and evaluation by the clinician. Then the clinician may then remote send commands to modify the settings of the hearing device 100 over the network 120. The hearing device's 100 processor or control system 220 may then receive the commands and implement the settings. Then, the process may begin again with new user feedback 605. If the feedback is negative, then the clinician may further modify the settings.

Finally, once the settings are finalized, they may be stored and associated with the user's profile 635 at some point in the system 150 for recalling. For instance, they may be stored on the mobile device 110 or the database 160 or other points in the system 150. Then those settings may be recalled and output to suggest settings 420 once the user 105 returns to the specific location, an acoustically similar situation, or generally attempts to recall its favorite settings. This process will allow a clinician to evaluate user feedback of a real sound environment while also analyzing the acoustic properties of the sound. Also, it will immensely increase the practicality of personalizing the hearing system 150 for specific environments.

Tuning Using Pre-Recorded Audio Sample

Figure 7:
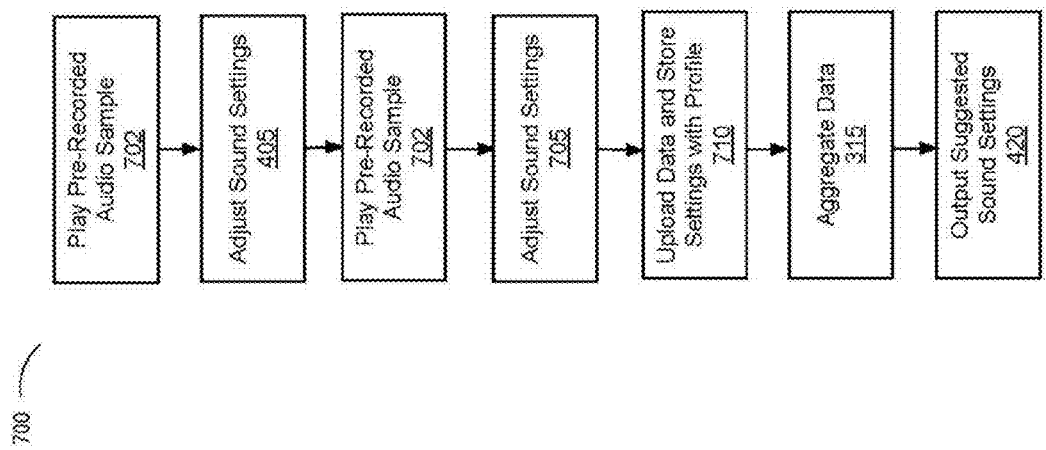
FIG. 7 is a flow chart illustrating a process for tuning a hearing device using a pre-recorded audio sample.

In some embodiments, part of the setting process for a hearing system 150 as disclosed herein may be to utilize pre-recorded audio samples as described in the pre-recorded setting process 700 illustrated in FIG. 7. First, pre-recorded audio samples may be played 702 through the speaker 215 of the hearing device 100 or mobile device 110 (or computer or other Internet connected computing device with speaker(s)). Then the user 105 may adjust the sound processing settings 405 accordingly based on their own feedback after hearing the pre-recorded audio sample played through one of the speakers. In some embodiments, the pre-recorded sound sample may be played several times, with the user 105 adjusting the sound settings 705 in-between playbacks of the pre-recorded audio sample 702. Eventually, once the user has arrived at a sound setting that they feel is adequate based on the pre-recorded sample, the settings may be saved as disclosed herein, and uploaded to be associated with the user's 105 profile 710. As disclosed herein, the settings may then be aggregated 315 and analyzed. Then this analyzed data may be utilized to output suggested sound settings 420 or the system 150 may simply recall a user's 105 previously saved sound settings.

The pre-recorded audio sample may be played over the hearing device's 100 speaker 125, the mobile device's 110 speaker, or another speaker associated with the system 150 that is within hearing range of the user 105. When the sound is played over the mobile device it may have different characteristics than when played over the hearing device speaker 110 due to the difference in range and acoustics. Therefore, a different pre-recorded audio sample may be played 702 based on which speaker 125 plays the sound.

The pre-recorded audio sample may be any mixture of frequencies, amplitudes and temporal information. For instance, in some embodiments, the pre-recorded sample may be in the human voice frequency range or consist of a human voice speaking. In other embodiments, it may just be non-speaking sounds in the human frequency range. Additionally, other frequencies may be included in the pre-recorded sample, including frequencies that are typical for environment noise that the average user 105 experiences. The noise samples could be of varying length, from 5 seconds to a minute to 30 seconds to 20 seconds or 2 minutes or other lengths. Additionally, the sample may contain any combination of frequencies and amplitudes associated with each of the frequencies.

The pre-recorded audio sample may be obtained from a variety of sources including from recording noise and human voices in a sound study or from other sources. For instance, the pre-recorded audio sample could be obtained from the aggregated data 315 from all other users 107 and analyzed for the noise frequencies with highest amplitudes on average. In some cases, the system could prompt the user to ask what language they speak or will be listening to, and play pre-recorded audio samples within the frequency and amplitude range for specific languages and dialects selected.

In other embodiments, perhaps a particular noise type is frequently experienced by all users, or all users within the same geographic region (and thus likely to experience similar noise) that competes with more desirable sounds such as speech. As one example, everyone in New York City may experience constant car horns or everyone in San Francisco may experience loud noise while riding the Bay Area Rapid Transit (BART) system. The system could analyze the data and pull out the frequency ranges that are most likely experienced and add those frequencies to the pre-recorded sample or similar frequencies that are averages within the same band so that the listener could optimize settings to minimize the impact of these sounds on their ability to detect and make use of more desirable sound signals.

In some embodiments, the pre-recorded sample may contain multiple steps for tuning the hearing device 100 and therefore may contain multiple segments of pre-recorded audio sample for the user to separately provide feedback. For instance, if all of the relative noise is played at once it may be harder for a user 105 to evaluate the effects of programming changes as noise is general experienced in more isolated incidents. Therefore, each audio sample might have a different frequency of common noise (e.g. the car horn/traffic noise) and an underlying human voice for the user 105 to provide feedback. In some embodiments, this will allow the user 105 to optimize certain noise filters for each bandwidth of relevant noise. Also, the user 105 may be presented with varying pitches of voices and amplitudes for further modification to ensure a robust tuning.

In some embodiments, prior to tuning with a pre-recorded audio sample, the device may record sound data 302 for a set period of time (e.g. 1 week, 2 weeks) while a user 105 experiences a normal work week, commuting to work, going to normal restaurants and shops, and other normal activities. This will allow the device to average or detect the most relevant sound signatures (i.e., non-human voice) a specific user 105 experiences on average. Then, the system 150 may be able to make a custom noise sample that could be overlaid on top of a human voice for the pre-recorded sample tuning method 700. Accordingly, in this embodiment, the pre-recorded sample will be customized and specialized for the particular user's 105 normal activities.

Instant Replay for a Hearing Device

Figure 8:
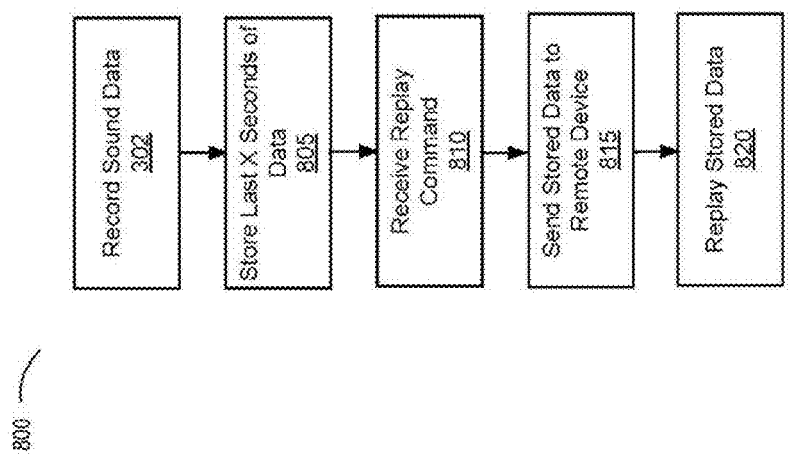
FIG. 8 is a flow chart illustrating a process for implementing an instant replay feature for a hearing device.

In some embodiments, and with reference to FIG. 8, the hearing system 150 may include an instant replay process 800 to allow the user 105 to replay the last few seconds or minutes of audio data recorded 302 by the hearing system 150. This may be useful in noisy situations, when a user 105 is distracted, or when a user 105 is trying to remember a phone number or directions. For instance, the microphone 225 on either the hearing device 100, the user's 105 mobile device, or other associated microphone, may record sound data 302 continuously and keep the last few seconds of audio data recorded 805, and discard or save older sound data. Then, when the user 105 requests a replay 810 by interacting through its mobile phone 110 or hearing device 100, the device may play back the last few seconds of data either through the speaker 215 on the hearing device 100 or mobile phone 110.

In some embodiments, the user 105 may have a choice of how many seconds of data are replayed. For example, the system 150 may store a minute or longer of audio data continuously, and the user might have an option on their phone as to how many seconds of replay the user 105 would like to request or certain windows of time. In some embodiments, the hearing device 100 may contain an instant replay button that either immediately replays the sound, sends it and saves it to other components of the system such as the mobile device 110 or pops up a notification on the mobile device requesting the amount of time for which playback is requested. The system 150 may include the ability to record locally with finite memory 235, local memory 235 and/or on memory 235 of the mobile device 110, and upload recordings to the remote server 130 and database 160 and synchronize recordings on all devices.

This sound data may be stored in the memory 235 of the hearing device 100 or the mobile device 110, or on other places in the system 150. In some embodiments, this may include storage by the server 130 in the database 160. The audio data loop may be saved in a buffer, flash memory, or other memory. In some embodiments, the audio data will be stored every few seconds from the buffer into other memory, so that the audio data is recorded in a few second, one second, five second, or other blocks of time. These blocks of time are then continuously saved 805 and time stamped, so that, in some embodiments, as new blocks of time are added, the oldest time block is discarded. This process may continue until a user 105 initiates instant replay 810 by pressing a button on the hearing device 100, by pressing a button or interacting with their mobile phone 110 or by other initiation methods.

Then, once instant replay command is received 810, the stored audio data will be placed back 820 to the user 105 over one of the speakers 215. Alternately, the system 150 may have pre-recorded sound played back on phone/tablet 110, computer, or server. In some embodiments, pushing instant replay will also save the audio file to memory 235 in the hearing device 100, and/or send the data to the mobile device 110 or a remote device 815 (e.g. server 130 and database 160) so that it may be further replayed by accessing through the system 150.

In some embodiments, the instant replay function may first filter the blocks of data using a different filter than currently being utilized or set by the hearing system 150. For example, in some embodiments, the instant replay function may have its own filter, and in particular, may filter out all other frequencies except human voice related frequencies. In other embodiments, the noise filter for voice may include an adaptive filter that filters out all other noise besides a specific voice, so that playback for instant replay only includes primarily a human voice. This is because instant replay will likely be used to repeat conversations, and would generally not be used to repeat other bands of noise that are not related to human voices. Additionally, directionality filters or other techniques may be utilized to filter out everything but the noise from a human voice with which a user 105 is having a conversation.

Particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly while operations may be depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

It should initially be understood that the disclosure herein may be implemented with any type of hardware and/or software, and may be a pre-programmed general purpose computing device. For example, the system may be implemented using a server, a personal computer, a portable computer, a thin client, or any suitable device or devices. The disclosure and/or components thereof may be a single device at a single location, or multiple devices at a single, or multiple, locations that are connected together using any appropriate communication protocols over any communication medium such as electric cable, fiber optic cable, or in a wireless manner.

It should also be noted that the disclosure is illustrated and discussed herein as having a plurality of modules which perform particular functions. It should be understood that these modules are merely schematically illustrated based on their function for clarity purposes only, and do not necessary represent specific hardware or software. In this regard, these modules may be hardware and/or software implemented to substantially perform the particular functions discussed. Moreover, the modules may be combined together within the disclosure, or divided into additional modules based on the particular function desired. Thus, the disclosure should not be construed to limit the present invention, but merely be understood to illustrate one example implementation thereof.

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a "data processing apparatus" on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The invention claimed is:

1. A mobile atoll comprising:
an antenna configured to receive audio data from a hearing device;
a GPS receiver configured to generate location data representing a location of the mobile device;
a memory configured to store at least instructions and sound settings for the hearing device; and
a processor coupled to the memory, wherein the processor is configured to use the instructions to cause the mobile device to:
transmit, to a server, the location data;
receive, from the server, sound level data, wherein the server is configured to generate at least the sound level data based at least on the location data;
generate a first command based at least on the sound level data; and
transmit, to the hearing device, the first command, wherein the first command is configured to modify a sound setting on the hearing device.

2. The mobile device of claim 1, wherein the first command configured to modify the sound setting is further configured to modify one or more of noise filters, volume controls, and/or amplifiers on the hearing device.

3. The mobile device of claim 1, wherein the processor is further configured to use the instructions to cause the mobile device to receive, from the server, establishment data representing a set of establishments within a certain distance of the location of the mobile device.

4. The mobile device of claim 3, further comprising:
a display configured to present a graphical user interface, wherein the processor is further configured to use the instructions to cause the mobile device to:
generate a set of user selectable elements representing the set of establishments based at least on the establishment data; and
present, on the display, the graphical user interface comprising the set of user selectable elements.

5. The mobile device of claim 4, wherein the processor is further configured to use the instructions to cause the mobile device to:
receive a user selection of one of the set of establishments via the set of user selectable elements; and
transmit, to the server, the user selection.

6. The mobile device of claim 1, wherein the processor is further configured to use the instructions to cause the mobile device to transmit, to the hearing device, a second command configured to modify the sound setting on the hearing device based at least on a current location indicated by the GPS receiver and a determination by the processor that the mobile device has changed location.

7. A system comprising:
a database configured to store at least sound level data and sound settings for hearing devices; and
a server coupled to the database, wherein the server is configured to:
receive, from a first mobile device, a first audio data and a first location data recorded at a first location and, from a second mobile device, a second audio data and a second location data recorded at a second location that is substantially similar to the first location
aggregate the first and the second audio data and the first and the second location data to generate sound level data associated with the first location; and
store the sound level data in the database.

8. The system of claim 7, wherein
the first location data references the first location and is associated with the first audio data, and
the second location data references the second location and is associated with the second audio data.

9. The system of claim 7, wherein the server is further configured to:
receive, from a third mobile device, an indication that the third mobile device is located at a third location that is substantially similar to the first location; and
transmit, to the third mobile device, the sound level data.

10. The mobile device of claim 1, wherein the processor is further configured to use the instructions to cause the mobile device to:
associate the location data with time data representing a date and a time; and
transmit, to the server, the time data.

11. The mobile device of claim 10, wherein the processor is further configured to use the instructions to cause the mobile device to receive a time based sound setting associated with the location data and the time data.

12. The mobile device of claim 1, wherein the processor is further configured to use the instructions to cause the mobile device to:
associate the location data with the audio data; and
transmit, to the server, the audio data.

13. The mobile device of claim 1, wherein the sound level data comprises decibel levels and content of certain frequencies.

14. The mobile device of claim 13, wherein the processor is further configured to use the instructions to cause the mobile device to generate the first command based at least on an analysis of the decibel levels and the content of certain frequencies.

15. The mobile device of claim 1, wherein the processor is further configured to use the instructions to cause the mobile device to:
receive, from the server, a suggested sound setting, wherein the server is further configured to generate the suggested sound setting based at least on the location data;
generate a third command configured to modify the sound setting on the hearing device based at least on the suggested sound setting;
transmit, to the hearing device, the third command.

16. The mobile device of claim 3, wherein the set of establishments comprises one or more of restaurants, bars, coffee shops, concerts, sporting venues, cities, and/or public transportation.

17. The system of claim 7, wherein the sound level data comprises decibel levels and content of certain frequencies.

18. The system of claim 9, wherein the server is further configured to:
aggregate the first and the second audio data and the first and the second location data to generate a suggested sound setting associated with the first location;
store the suggested sound setting in the database; and
transmit, to the third mobile device, the suggested sound setting.

19. The system of claim 18, wherein the suggested sound setting is configured to modify one or more noise filters, amplifiers, and/or volume controls of a hearing device.

20. A non-transitory computer readable medium having instructions stored thereon, that, when executed on a mobile device, cause the mobile device to perform operations, the operations comprising:
receiving, by an antenna, audio data from the hearing device;
generating, by a GPS receiver, location data representing a location of the mobile device;
transmitting, to a server, the location data;
receiving, from the server, sound level data, wherein the server is configured to generate at least the sound level data based at least on the location data;
generating a command based at least on the sound level data; and
transmitting, to the hearing device, the command, wherein the command is configured to modify a sound setting on the hearing device.

* * * * *